United States Patent [19]
Paluch

[11] 3,800,516
[45] Apr. 2, 1974

[54] CARBON DIOXIDE ABSORBER

[76] Inventor: Bernard R. Paluch, 1607 Cedar Ln., Wheeling, Ill. 60056

[22] Filed: July 6, 1971

[21] Appl. No.: 159,617

[52] U.S. Cl............... 55/354, 23/284, 55/390, 55/DIG. 35, 128/42.6
[51] Int. Cl............................................. B01d 27/08
[58] Field of Search................ 55/77, 78, 351–354, 55/390, 274, 524, 73, 316, DIG. 35; 128/142.6; 210/387, 400, 401; 23/284

[56] References Cited
UNITED STATES PATENTS

| 1,481,221 | 1/1924 | Nuss | 55/78 |
| 2,017,779 | 10/1935 | Vosburgh | 55/74 |
| 3,019,127 | 1/1962 | Czerwonka et al. | 55/316 |
| 3,117,849 | 1/1964 | Selke | 55/354 |
| 3,337,898 | 8/1967 | Schmid et al. | 55/354 |
| 3,498,029 | 3/1970 | Messinger et al. | 55/73 |

FOREIGN PATENTS OR APPLICATIONS

| 468,084 | 6/1937 | Great Britain | 55/274 |
| 120,192 | 11/1947 | Sweden | 55/354 |

*Primary Examiner*—Bernard Nozick

[57] ABSTRACT

A carbon dioxide absorber assembly is provided in which the passing gas stream traverses at least one layer of a chemical composition which effectively removes carbon dioxide therefrom by chemical reaction or physical absorption. The layer or layers of said chemical composition is mechanically supplied to and withdrawn from the absorption zone in transverse direction to said gas stream.

5 Claims, 5 Drawing Figures

CARBON DIOXIDE ABSORBER

DETAILED DESCRIPTION OF THE INVENTION

In many commercial processes, gas streams are forwarded from a generating source to which the said gas is recirculated. In many instances, the gas stream must be treated to remove carbon dioxide therefrom to prevent its accumulation therein. Among the important applications of a device which must remove carbon dioxide from a gas stream are the respiratory or breathing devices such as those used in under-water work, anesthesia, metabolism studies, mines, construction work, fireman's masks, etc. In all these and other instances, exhaled gas passes through a closed system where carbon dioxide would accumulate to toxic levels, if not effectively removed.

To-date, many breathing and other devices have been described but of those presently used, most have one or more well-recognized deficiencies; for instance, they have a low carbon dioxide absorption efficiency and capacity and require close observation during use to detect the point of unacceptable operation, even though a color indicator may show when that point is reached which may, because of channelling, be too late to take corrective measures. Another deficiency, particularly in assemblies used in anesthesia, lies in the danger of cross-infections between patients if the used device is not discarded after use with one patient, even though it may be far from being exhausted. If the unit is too costly to discard, substantial expenses are incurred in sterilizing procedures. Another problem of existing devices is the formation of passage ways for the gas stream through passages already exhausted in carbon dioxide absorption capacity, because other passages become partially plugged.

Other deficiencies in today's stationary absorption devices include the accumulation of highly caustic solutions or suspensions as a result of water production during absorption with attendant caution necessary in handling and disposal of said accumulations; an increase in resistance to flow caused by an expansion in granule size as a result of the absorption reaction; the necessity to use a large volume of granules to insure adequate opportunity for the carbon dioxide molecules to contact absorption composition, with attendant increase in mechanical dead space in the flow circuit.

It is therefore an object of this invention to provide an absorption assembly for carbon dioxide in which the absorbing means for said carbon dioxide is continuously supplied to and removed from the absorption zone whether completely exhausted and/or contaminated or not; it is another object of the present invention to provide a carbon dioxide absorption device wherein a uniformly constant capacity for carbon dioxide absorption is presented to the gas flow; it is still another object of the present invention to provide a carbon dioxide absorption device in which substantially only the exposed portion of the absorption composition is discarded after use while preventing the gas stream from contacting partially used or contaminated absorbant; it is a further object of this invention to provide a carbon dioxide absorption mechanism in which the carbon dioxide absorbing composition can be supplied in cartridge form which is simple, economical and practical to replace and discard.

Other objects and advantages of the invention will become apparent from the detailed description of a simple embodiment thereof, read in conjunction with the accompanying drawings which form a part of this specification, and in which.

Figure 1:
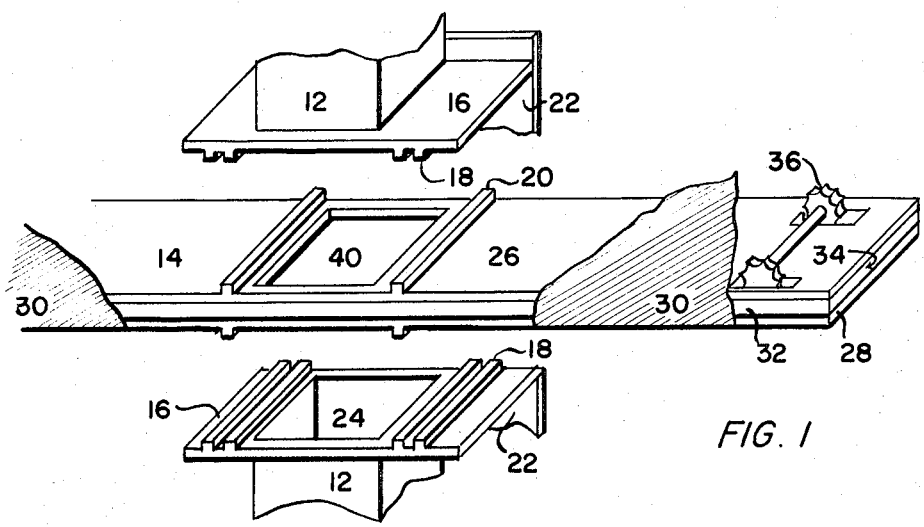
FIG. 1 is a front view of the entire assembly of one particular embodiment of the invention in cut-away sections.
Figure 4:
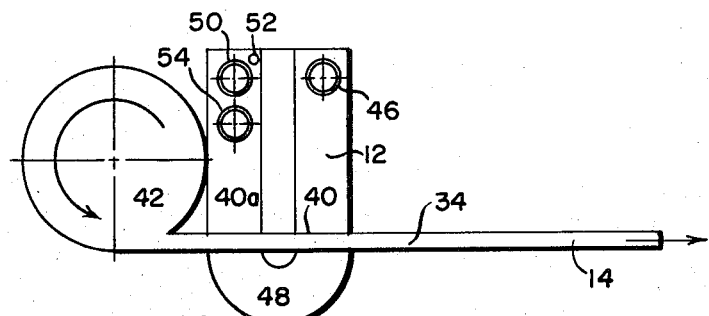
FIG. 4 is a front view of a U-shaped absorber.

Referring to the drawings, particularly FIGS. 1 and 4, it will be seen that the new device comprises a gas passage chamber 12 and an absorbant forwarding means 14. In FIG. 1, flanges 16 of the gas passage chamber are shown with ribs 18 which are designed to form a seal with ribs 20 of the absorbant forwarding means 14. The gas passage assembly of which a top cut-away and a bottom cut-away is shown depicts back flanges 22 which are designed to hold the top and the bottom sections together in such fashion that they form a seal when clamped together while properly aligning the gas passage openings 24 of the two sections. The absorbant carrier subassembly 14 has a top plate 26 and a bottom plate 28, both equipped with ribs 20 which form a seal with the ribs of the top and bottom sections of the gas passage assembly and a front plate 30 (cut away) equipped with inside ribs (not shown) to form a seal with the front of the gas passage assembly. The absorbant carrier sub-assembly has an open passage way 32 between top plate 26 and bottom plate 28 through which the absorbant composition 34 is forwarded. This forwarding is regulated by sprocket roller 36.

Figure 2:
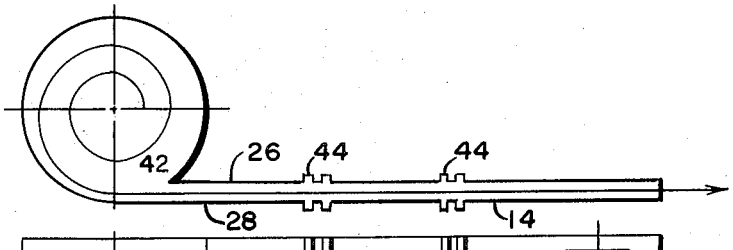
FIG. 2 is a front view of a simple supply means subassembly for the carbon dioxide absorbing material.
Figure 3:
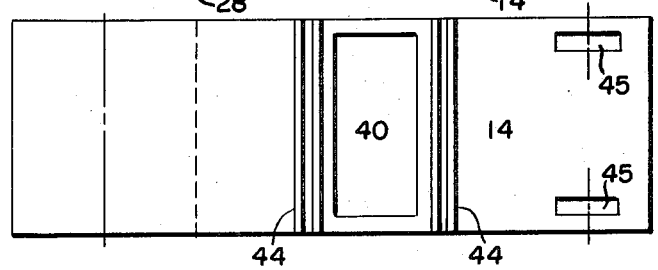
FIG. 3 is the top view of the sub-assembly of FIG. 2.

The carrier sub-assembly 14, shown in more detail in FIGS. 2 and 3, has a window 40 which, when united with the gas passage assembly, aligns with opening 24 of the latter. A gasket material frames all sides of window 40 to insure that no pressure loss occurs through this joinder of film, gas stream chamber and film transport passage. The absorbant composition is supplied in a continuous film 34 which is wider than window 40 so that all of the gas travelling from its top section to its bottom section must pass through window 40 which is completely covered by film 34.

While the embodiment of FIG. 1 shows a device in which only the sealed absorbant carrier sub-assembly needs to be replaced after exhaustion or only a new absorbant film needs to be inserted into cartridge 42 (FIG. 2), FIGS. 2, 3, 4 and 5 show modifications which are intended for total replacement after the initially supplied absorbant film is exhausted. In FIGS. 2 and 3, the absorbant forwarding sub-assembly is shown with supply casette or cartridge 42 designed to contain a coil or roll of a carbon dioxide absorbing film or matrix. Such a supply may be provided in the form of a roll of a porous medium such as, for instance, filter paper containing the absorbant or several layers of a perforated or porous matrix containing between matrix layers the absorbant composition for carbon dioxide. The absorbant composition in form of a film 34 travels in a sealed passage from cartridge 42 to window 40 and is collected for discarding in conventional fashion after leaving the absorption zone in window 40. Ribs 44 in FIGS. 2 and 3 are means for sealing this sub-assembly to the gas passage chamber to form an integral unit from which the film carrying sub-assembly can easily be removed for replacement, or a fully disposable unit or a unit in which only a new film of new absorbant supply is inserted. Slots 45 provide openings through which feed gear sprockets contact the film as a simple forwarding means.

Figure 5:
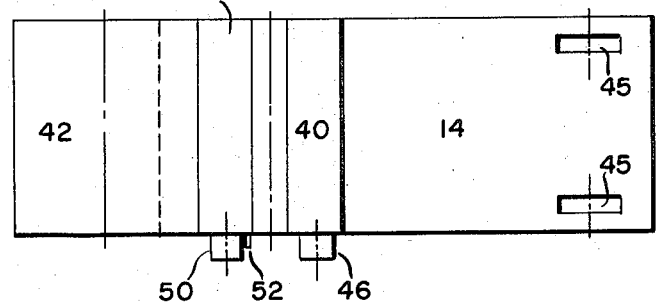
FIG. 5 is the top view of the sub-assembly of FIG. 4.

In the embodiment shown in FIGS. 4 and 5, the gas passage chamber 12 is U-shaped. Gas enters inlet port 46, passes through window 40 where it contacts partially exhausted absorbant film 34 and after traveling through closed compartment 48, it contacts fresh absorbant film 34 in window 40a before reaching outlet port 50. This modification also shows the customary additional gas inlet port 52 often used in breathing devices, where fresh oxygen and/or, when used in anesthesia, an anesthetic agent can be added to the gas stream. The absorbant material for carbon dioxide is supplied from casette 42 in the form of a coiled film 34 which is shown only in the absorption zone of the gas passage. Auxiliary port 54 may be located anywhere within the unit: it is intended for attaching a breathing bag when the device is used in a respiratory device with unidirectional gas flow.

While the drawings described above refer only to a straight and a U-shaped gas passage chamber, another modification consists of concentric chambers: the inside tube or chamber forwards the incoming gas to a frame or window covered with the absorbant film with the sealed film carrier placed in such a fashion that the gas must first pass through the film into an outer compartment from where it passes again through the film into the outer chamber before reaching the exit port. This arrangement is particularly advantageous in those instances where it is essential that any reaction heat from the absorption zone is dissipated. In any of these modifications, the new device may be equipped with a pop-off valve which assures that no undue pressure build-up occurs.

The operation of the new carbon dioxide absorption device has been explained with reference to the specific modifications shown by the attached drawings. However, it should be kept in mind, that these drawings only represent illustrations of simple embodiments which do not represent the many modifications that are included in the scope of this invention. Among these modifications, a device where a plurality of absorbant films travel through the gas flow passage is of particular value. In that embodiment, the various films containing carbon dioxide absorbant may be arranged to travel in the same direction or they may be crossing the gas passage chamber in different directions. Obviously, where a plurality of absorbant forwarding sub-assemblies are employed, each film may carry a different type of absorbant.

It is usually preferred that the absorbant film crosses the gas flow chamber in the perpendicular direction, but such an arrangement is not necessary: the film or films may intersect with the gas flow direction at angles between 45° and 135°C, preferably at 75°–105° C. Also, the above description is directed to the embodiment in which gas flow is unidirectional; the new device may also be used where gas flow is in to-and-fro fashion.

The carbon dioxide absorption composition is most effectively supplied in a coil or roll of a porous matrix supporting or being dispersed with the acting absorbant material. The most economical matrix material is a cellulosic mat such as those made from wood pulp or cotton fiber and having a substantial moisture absorption capacity, e.g.; a cotton felt or a filter paper. This kind of a matrix material is treated by soaking it thoroughly with a concentrated solution of a carbon dioxide absorbant and drying the matrix material by evaporating the solvent. Using this method, the absorbant disperses throughout the matrix material and forms a vast number of absorption centers with a very large total surface area to provide efficient carbon dioxide absorption. A similar matrix film can be made from a glass fiber felt which has the added advantage of producing substantially no resistance to gas flow.

The absorbant may also be supplied in sandwich form between several layers of a matrix film. In this instance, the matrix material may be made of any kind of an inert porous composition: it may be a perforated paper, a loosely woven cloth, a synthetic or natural fiber, nonwoven fabric or similar flexible substrates. In this type of a matrix, the absorbant is placed between the matrix layers in granular form with or without supporting means for the individual granules. A convenient support material is kieselguhr or silica gel. Where the matrix is an inert material carrying granules of absorbant material on top of one or between several layers, it is often advantageous to emboss its surface or otherwise create a restraint for the shifting of the granules on the matrix surface. Obviously, where a plurality of absorbant material films are incorporated into such a layered structure of an absorbant film, the film provides a much higher degree of carbon dioxide absorption per unit of film volume, and the absorbant can be packed more loosely between matrix layers to insure free gas flow through the matrix/absorbant film.

Among the carbon dioxide absorbing materials, alkali and earth-alkali hydroxides are most commonly employed. A number of commercially available products are specifically designed for use as carbon dioxide absorbants, e.g., Soda lime which contains about 95% of calcium hydroxide and 5% of sodium hydroxide (marketed by Malinckrodt Chemical Corp.), Baralyme[R] which contains 20% barium hydroxide octahydrate and 80% of calcium hydroxide (marketed by Thomas Edison Co.), and Soda Sorb[R] which contains 4% alkali hydroxides, 77–82% calcium hydroxide and 14–19% moisture (marketed by Dewey and Almy Chemical Co.). These products are provided in hard granules which resist crumbling, are relatively nondusting and relatively non-hygroscopic; they are therefore particularly useful when the intended use is in the form of the above-described layered matrix film. Where a felt or filter paper coil is the desired supply form for the carbon dioxide absorbant, a solution of a water soluble alkali or earth-alkali hydroxide or a mixture thereof is preferably used for incorporation of the absorbant into the matrix. Of course, the absorption of carbon dioxide by the present device does not have to be through a chemical reaction: carbon dioxide may be physically adsorbed to a material with such adsorptive capacity, and any reference herein to absorption is meant to include the phenomenon of adsorption as well.

As will readily be appreciated by those skilled in the art, the speed for forwarding the absorbant film through the gas flow chamber of the present device is a function of a number of easily pre-determinable parameters: the amount of carbon dioxide in the gas flowing through the absorption zone per time unit, the amount of carbon dioxide absorbant per volume unit of absorbant/matrix film, the absorption capacity of said film, the dimension of the window or frame of the absorption zone, and the number of absorbant/matrix films that pass through the gas flow chamber. The necessary speed for forwarding the absorbant film can thus be calculated to assure that the stoichiometric absorptive capacity of absorbant material passing through the gas passage zone exceeds the maximum amount of carbon dioxide that may be present in said gas stream. Preferably, the film speed is adjusted in such a way that the stoichiometric equivalent of the available carbon dioxide is exceeded by 20–100% by carbon dioxide absorptive capacity passing through the absorption zone in a given time interval. For instance, when the present device is used in a respiratory unit, the film speed should be set such that an absorbant film carrying sodium hydroxide as the sole absorbant forwards at least 0.75 g. of the absorbant through the absorption zone per minute, preferably 0.9 – 1.5 g/min. This range is based on a carbon dioxide volume of 200 ml/min. in exhaled gas.

The film forwarding mechanism can be driven by any suitable means, e.g., a spring-loaded gear train, an electric motor or the film may be taken up after passing the absorption zone by a take-up reel that is powered by a weight suspended from its axle by a cord coiled over an extension of said axle.

When the driving speed exceeds the above-indicated limit of absorbant amount versus carbon dioxide volume, replacement of the film, film/cartridge sub-assembly or the entire device must be effected more often than necessary since the absorbant is not effectively used. When the film speed is slower than the lower limit indicated, not all the carbon dioxide passing through the window with the film is absorbed. For many commercial uses, however, this may be acceptable, as long as the carbon dioxide content of the gas leaving the absorption chamber does not exceed an acceptable level. In breathing devices, it is usually required that the air stream re-entering the patient contain less than 0.5% carbon dioxide. This is easily achieved and assured by exceeding the calculated stoichiometric equivalent of absorbant material per time unit by 20%, thus allowing for occasional unexpected carbon dioxide peak amounts in the gas stream.

The advantages of the new absorber device will be readily apparent to those skilled in the art. Among these, the following are more prominent: (a) assurance that the device may be reused until the absorbant film supply is exhausted without danger of retaining any germs in the film from one use to the next: the operator will simply forward a length of the absorbant film slightly exceeding the window length between uses and discard the previously exposed portion of the film. (b) The heat connected with the chemical reaction between carbon dioxide and the absorbant is better dissipated than in previously known devices provided for this kind of use, since the film leaves the absorption zone immediately upon completion of this exothermic reaction. In the devices known to-date, the absorbant mass remains stationary in the gas flow passage and heat accumulates therein. (c) Assurance that caking or channelling often encountered in other devices with stationary absorbant masses is virtually eliminated because of the thinness of the film and its continuous motion which removes any cake or channel almost immediately from the absorption chamber. (d) The absorbant film utilizes a much larger number of much smaller sized absorbant particles which greatly increase the total surface area available for absorption; thus the rate of carbon dioxide absorption is substantially increased, concurrent with an improved utilization of total absorbant capacity. (e) The absorbant film may be contained in a porous, layered matrix which offers little or no resistance to gas flow while concurrently preventing loss of or contamination by fine particles that may be produced through absorbant composition particle fracture as a result of handling. (f) The total gas volume contained within the system can be substantially reduced in comparison to that found in presently existing devices used in this manner. This is of significant importance in respiratory applications. (g) Any moisture formed during the absorption reaction can easily be removed on a continuous basis from an additional moisture exit valve located in the lowest portion of the device, preventing clogging of absorbant granule pores as is found in presently available devices, and (h) The absorbant carrying matrix presents a uniform pressure gradient to the gas flow through the absorption zone(s), eliminating any preferential flow paths through channels.

In the most suitable embodiment of the described device, the cartridge housing and the passage way for the absorbant film are constructed in clear, rigid plastic which enables observation of the film supply while the device is in use. The absorption chamber providing the gas flow passage may also be made from a rigid, transparent plastic material, although observation in that section is not essential. If the film cartridge or casette is not transparent, it may be provided with a simple alarm mechanism such as a feeler arm connected to a buzzer which alerts the operator when the absorbant film supply is about exhausted. In any construction of the device, it will be understood that the united gas passage chamber and film carrier sub-assembly form a sealed unit with openings provided only for gas inlet, gas outlet and film discharge, whether the apparatus is molded as a unitary structure with a sideway opening for film insertion into the cartridge and threading, or whether the absorber film carrier is built as a disposable sub-assembly that can be united with the gas flow chamber in sealed fashion.

Of course, the absorber film passage way should be sufficiently dimensioned to allow passage of the thickest film desired. If a thinner film is used than the passage way would permit, the gasket around the window in the gas stream chamber will prevent escape of gas or contamination from the outside. In any event, the film-carrying sub-assembly can be constructed from a material that will permit a sterilization treatment when it is desired to re-use the film storage and forwarding assembly and to thread a fresh film into this assembly for further use.

I claim:

1. A device for removing carbon dioxide from a gas stream comprising a sealed chamber with an inlet port for said gas stream, an outlet port for said gas stream, at least one carbon dioxide absorption zone designed to have a defined, sealed passage way and suitable mechanical forwarding means continuously supplying at least one flexible, porous matrix material to and through said absorption zone, supporting or carrying a carbon dioxide absorbing material to said absorption zone essentially in perpendicular direction to said gas stream ports from a (supply) storage source which continuously supplies said porous matrix and absorbing material to said absorption zone through an inlet port located on one side of said chamber, to and through said chamber and removed through an outlet port located on the opposite side of said chamber, said storage source being sealed to said sealed chamber in such a way that all of said gas stream must pass at least once through said carbon dioxide absorbing material while said absorbing material is drawn continuously through said sealed passage way and through said absorption zone and removed from said absorption zone by the suitable mechanical means.

2. The device of claim 1 which also contains a supplemental gas inlet port through which additional fresh or other carbon dioxide-free gas can be supplied to the absorption chamber.

3. The device of claim 1 wherein the gas stream chamber is U-shaped and the gas flows through side-by-side absorption zones fed by the same supply source for carbon dioxide absorbing material and whereby the gas prior to reaching the outlet port passes through a second absorption zone supplied with fresh carbon dioxide absorbing material and said absorbing material subsequently passes through a first absorption zone located between the inlet port and said second absorption zone.

4. The device of claim 1 wherein said matrix is a woven or non-woven substrate containing dispersed therein said carbon dioxide absorbing material, said substrate offering substantially no resistance to said gas stream.

5. The device of claim 1 wherein means are provided for exposing the gas stream to a carbon dioxide absorbant composition which offers substantially no resistance or uniformly low resistance to said gas stream.

* * * * *